United States Patent
Nuhfer et al.

(10) Patent No.: US 8,860,313 B2
(45) Date of Patent: Oct. 14, 2014

(54) UNIVERSAL-VOLTAGE SELF-HEATING THERMAL DETECTOR

(75) Inventors: Matthew W. Nuhfer, Bethlehem, PA (US); Thomas M. Shearer, Macungie, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 226 days.

(21) Appl. No.: 13/307,845

(22) Filed: Nov. 30, 2011

(65) Prior Publication Data

US 2013/0134882 A1    May 30, 2013

(51) Int. Cl.
*H01J 7/24*    (2006.01)

(52) U.S. Cl.
USPC .......................................................... 315/112

(58) Field of Classification Search
USPC .................................. 315/112–118
See application file for complete search history.

(56) References Cited

U.S. PATENT DOCUMENTS

| | | | |
|---|---|---|---|
| 3,921,032 A | 11/1975 | Hallay | |
| 3,965,387 A | 6/1976 | Stuart et al. | |
| 4,170,744 A | 10/1979 | Hansler | |
| 4,488,091 A | 12/1984 | Muzeroll et al. | |
| 4,649,320 A | 3/1987 | Hough et al. | |
| 4,675,777 A * | 6/1987 | Watrous | 361/106 |
| 4,694,223 A | 9/1987 | Campolo | |
| 4,713,721 A * | 12/1987 | Pelonis | 361/100 |
| 4,740,861 A | 4/1988 | Droho et al. | |
| 4,789,810 A | 12/1988 | Ottenstein | |
| 4,847,536 A | 7/1989 | Lowe et al. | |
| 4,949,214 A | 8/1990 | Spencer | |
| 4,963,797 A | 10/1990 | Kulka et al. | |
| 5,023,744 A | 6/1991 | Hofsass | |
| 5,089,799 A | 2/1992 | Sorenson | |
| 5,315,214 A | 5/1994 | Lesea | |
| 5,402,039 A | 3/1995 | Wolfe | |
| 5,955,793 A | 9/1999 | Khadkikar et al. | |
| 6,100,644 A | 8/2000 | Titus | |
| 6,342,997 B1 | 1/2002 | Khadkikar et al. | |
| 6,831,426 B2 * | 12/2004 | Brevetti et al. | 315/291 |
| 6,921,884 B2 | 7/2005 | Disalvo | |
| 6,982,528 B2 | 1/2006 | Cottongim et al. | |
| 7,009,829 B2 * | 3/2006 | Lentz et al. | 361/103 |

(Continued)

OTHER PUBLICATIONS

Omega Lighting, HID Dual Voltage Fixture Installation Instructions, Nov. 2003, 1 sheet.

*Primary Examiner* — Thienvu Tran
(74) *Attorney, Agent, or Firm* — Mark E. Rose; Philip N. Smith; Bridget L. McDonough

(57) ABSTRACT

A self-heating thermal protector operates to disconnect a load control device for a lighting load from an AC power source when insulation is present around the insulation detector independent of the magnitude of an AC mains line voltage of the AC power source. The insulation detector comprises a temperature-sensitive switch and a constant power circuit that are located in a thermally-conductive enclosure. The temperature-sensitive switch is coupled between the AC power source and the load control device and is rendered conductive and non-conductive in response to a temperature inside the enclosure. The constant power circuit is coupled in parallel with the AC power source and dissipates a constant amount of power independent of the magnitude of the AC mains line voltage when the temperature-sensitive switch is conductive. Restricted airflow over the thermal protector causes the temperature inside the enclosure to increase, such that the temperature-sensitive switch is rendered non-conductive.

17 Claims, 3 Drawing Sheets

(56) References Cited

U.S. PATENT DOCUMENTS

| | | |
|---|---|---|
| 7,164,102 B2 | 1/2007 | Disalvo |
| 7,372,210 B2 | 5/2008 | Scolaro |
| 7,436,131 B2 | 10/2008 | Cottingim et al. |
| 7,460,378 B2 | 12/2008 | Faccin |
| 7,675,250 B2 | 3/2010 | Chitta et al. |
| 2008/0055914 A1 | 3/2008 | O'Rourke |
| 2009/0230892 A1 | 9/2009 | Vinter |
| 2011/0204790 A1* | 8/2011 | Arik et al. .................... 315/113 |

* cited by examiner

UNIVERSAL-VOLTAGE SELF-HEATING THERMAL DETECTOR

BACKGROUND OF THE INVENTION

1. Field of the Invention

The present invention relates to load control systems for controlling the power delivered from an alternating-current (AC) power source to an electrical load, and more particularly, to a universal-voltage insulation detector for a recessed downlight fixture having a lighting load, such as a fluorescent lamp or a light-emitting diode (LED) light source.

2. Description of the Related Art

Downlight fixtures are typically mounted to a ceiling and are often recessed into the ceiling to provide an aesthetically pleasing appearance. FIG. 1 is a perspective view of a prior art recessed downlight fixture 10, which may be mounted to a ceiling, for example, in a drop ceiling panel 12. The downlight fixture 10 comprises a lighting load, e.g., a compact fluorescent lamp 14, which is installed in a housing 16. The lighting load could alternatively comprise an incandescent lamp or a light-emitting diode (LED) light source (i.e., an LED light engine). The downlight fixture 10 further comprises a junction box 18 for housing a load regulation device, such as an electronic ballast 20 (FIG. 2). The ballast 20 is electrically coupled to the fluorescent lamp 14 in the housing 16 and is required to drive the fluorescent lamp in order to properly illuminate the lamp. The junction box 18 comprises a conduit opening 22, which is adapted to be connected to an electrical conduit (not shown) for receipt of an alternating-current (AC) mains line voltage $V_{AC}$ from an AC power source 24 (FIG. 2). Alternatively, the downlight fixture 10 could comprise an LED driver (rather than the electronic ballast 20) if the lighting load is an LED light source.

In order to get a safety listing from a safety certification organization, such as Underwriters Laboratories (UL), lighting fixtures, such as the downlight fixture 10, must undergo a series of thermal tests. One test is the "abnormal test" in which the downlight fixture 10 (including the electronic ballast 20 and the controlled fluorescent lamp 12) is mounted in a simulated ceiling with insulation placed on top of the downlight fixture. The temperature on the outer surface of the downlight fixture 10 either must not exceed a temperature limit during the test, or, if the temperature of the downlight fixture exceeds the temperature limit, the lighting load must be turned off within three hours of exceeding the temperature limit.

Accordingly, the prior art downlight fixture 10 may include an insulation detector 30 that is electrically coupled to the electronic ballast 20 and operates to cut off the AC mains line voltage $V_{AC}$ from the electronic ballast 20 and the fluorescent lamp 12 when insulation is present around the insulation detector, such that the downlight fixture is able to pass the abnormal test. The insulation detector 30 is mounted to an exterior surface of the housing 16 or the junction box 18 (e.g., in a conduit opening as shown in FIG. 1), such that the insulation detector protrudes into the space around the fixture 10, i.e., into the insulation surrounding the insulation detector.

FIG. 2 is a simplified schematic diagram of the downlight fixture 10 showing the insulation detector 30 in greater detail. The insulation detector 30 comprises three connections: a hot connection H electrically coupled to the hot side of the AC power source 24, a neutral connection N electrically coupled to the neutral side of the AC power source, and a switched hot terminal SH coupled to the electronic ballast 20. The insulation detector 30 is coupled in series electrical connection between the AC power source 24 and the electronic ballast 20, and is able to disconnect the AC mains line voltage $V_{AC}$ from the ballast.

The insulation detector 30 comprises a thermal cut-off (TCO) switch 32 (i.e., a bimetallic switch) and a resistor 34. The TCO switch 32 and the resistor 34 are both contained within an elongated thermally-conductive enclosure 36 (as shown in FIG. 1). The resistor 34 operates as a heat source when the TCO switch 32 is closed and the AC mains line voltage $V_{AC}$ is coupled across the hot and neutral terminals H, N. The cut-off temperature of the TCO switch 32 is chosen such that the TCO switch remains closed when the downlight fixture 10 is mounted to a ceiling without insulation surrounding the downlight fixture. In other words, the heat generated by the resistor 34 dissipates from the insulation detector 30 into the surrounding air without causing the TCO switch 32 to open. However, if the downlight fixture 10 is surrounded by insulation (e.g., during the abnormal test), the heat generated by the resistor 34 is not able to dissipate into the insulation and the temperature inside the insulation detector 30 increases, such that the TCO switch 32 opens, thus disconnecting the electronic ballast 20 from the AC power source 24. An example of the prior art insulation detector 30 is described in greater detail in U.S. Pat. No. 6,921,884, issued Jul. 26, 2005, entitled SELF-HEATING THERMAL PROTECTOR, the entire disclosure of which is hereby incorporated by reference.

Typical electronic ballasts and LED drivers are able to operate across a range of AC mains line voltages (e.g., from approximately 120 V to 277 V). However, prior art insulation detectors, such as the one described in the '884 patent, are only rated to operate with a specific AC mains line voltage (e.g., at either 120 V or 277 V). As a result, lighting fixture manufacturers must manufacture and stock separate downlight fixtures for both of the rated voltages of the insulation detectors 30 even though the electronic ballasts and LED driver operates across a range of AC mains lines voltages. This, of course, leads to additional stock keeping units (SKUs) and increased inventory cost for the lighting fixture manufacturer.

Accordingly, there is a need for an insulation detector that is able to operate at a plurality of different AC mains line voltages.

SUMMARY OF THE INVENTION

According to an embodiment of the present invention, a self-heating thermal protector operates to disconnect an electrical load from an AC power source when insulation is present around the insulation detector independent of the magnitude of an AC mains line voltage of the AC power source. The thermal protector comprises a thermally-conductive enclosure, a temperature-sensitive switch, and a constant power circuit. The temperature-sensitive switch is located within the enclosure and is adapted to be coupled in series electrical connection between the AC power source and the electrical load. The temperature-sensitive switch is rendered conductive and non-conductive in response to an internal temperature inside the thermally-conductive enclosure. The constant power circuit is located within the enclosure and is adapted to be coupled in parallel electrical connection with the AC power source to receive an AC mains line voltage when the temperature-sensitive switch is conductive. The constant power circuit dissipates a constant amount of power independent of the magnitude of the AC mains line voltage when the temperature-sensitive switch is conductive. Restricted airflow over the thermal protector causes the internal temperature inside the thermally-conductive enclosure to increase, such that the temperature-sensitive switch is rendered non-conductive.

According to another embodiment of the present invention, a self-heating thermal protector for a lighting fixture having a lighting load operable to receive power from an AC power source comprises a thermally-conductive enclosure, a temperature-sensitive switch, a heating resistor, and a constant current circuit. The lighting fixture also having a load regulation device electrically coupled to the lighting load for driving the lighting load. The temperature-sensitive switch is located within the enclosure and is adapted to be coupled in series electrical connection between the AC power source and the load regulation device. The temperature-sensitive switch is rendered conductive and non-conductive in response to an internal temperature inside the thermally-conductive enclosure. The constant current circuit is coupled in series electrical connection with the heating resistor, such that the series combination of the heating resistor and the constant current circuit is adapted to be coupled in parallel electrical connection with the AC power source to receive an AC mains line voltage when the temperature-sensitive switch is conductive. The constant current circuit conducts a heating current through the heating resistor when the temperature-sensitive switch is conductive, where the heating current has a constant magnitude independent of the magnitude of the AC mains line voltage. Restricted airflow over the thermal protector causes the internal temperature inside the thermally-conductive enclosure to increase, such that the temperature-sensitive switch is rendered non-conductive and the load regulation device is disconnected from the AC power source.

In addition, a lighting fixture for housing a lighting load operable to receive power from an AC power source is also described herein. The lighting fixture comprises a load regulation device electrically coupled to the lighting load for driving the lighting load in order to properly illuminate the lighting load. The lighting fixture further comprises a self-heating thermal protector coupled in series electrical connection between the AC power source and the load regulation device. The thermal protector includes a temperature-sensitive switch, a heat source, and a thermally-conductive enclosure surrounding the temperature-sensitive switch and the heat source. The temperature-sensitive switch is coupled in series electrical connection between the AC power source and the load regulation device, and is operable to be rendered conductive and non-conductive in response to an internal temperature inside the thermally-conductive enclosure. The heat source is adapted to be coupled in parallel electrical connection with the AC power source to receive the AC mains line voltage when the temperature-sensitive switch is conductive. The heat source dissipates a constant amount of power independent of the magnitude of the AC mains line voltage when the temperature-sensitive switch is conductive. Restricted airflow over the thermal protector causes the internal temperature inside the thermally-conductive enclosure to increase, such that the temperature-sensitive switch is rendered non-conductive and the load regulation device is disconnected from the AC power source.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
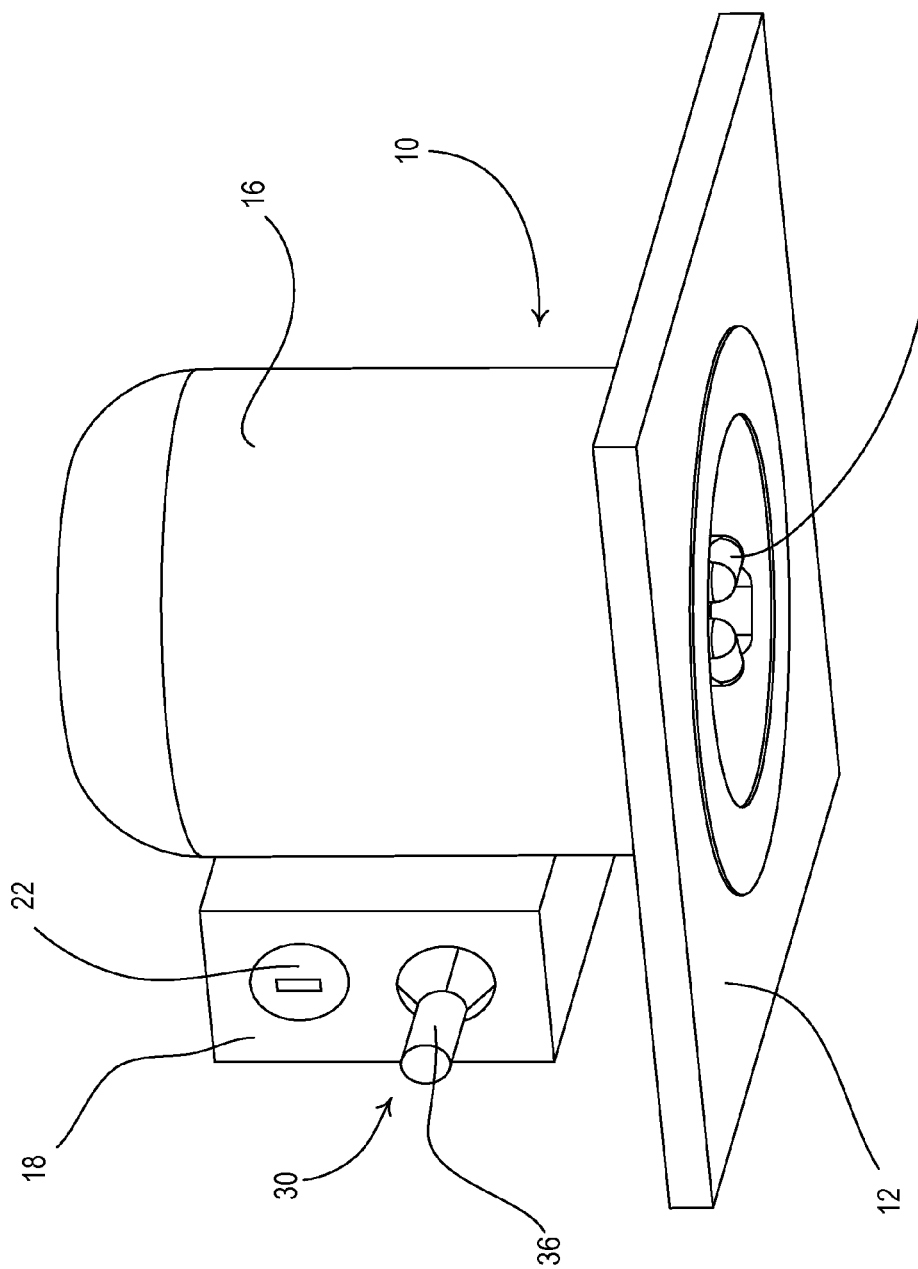
FIG. 1 is a perspective view of a prior art recessed downlight fixture having an insulation detector.
Figure 2:
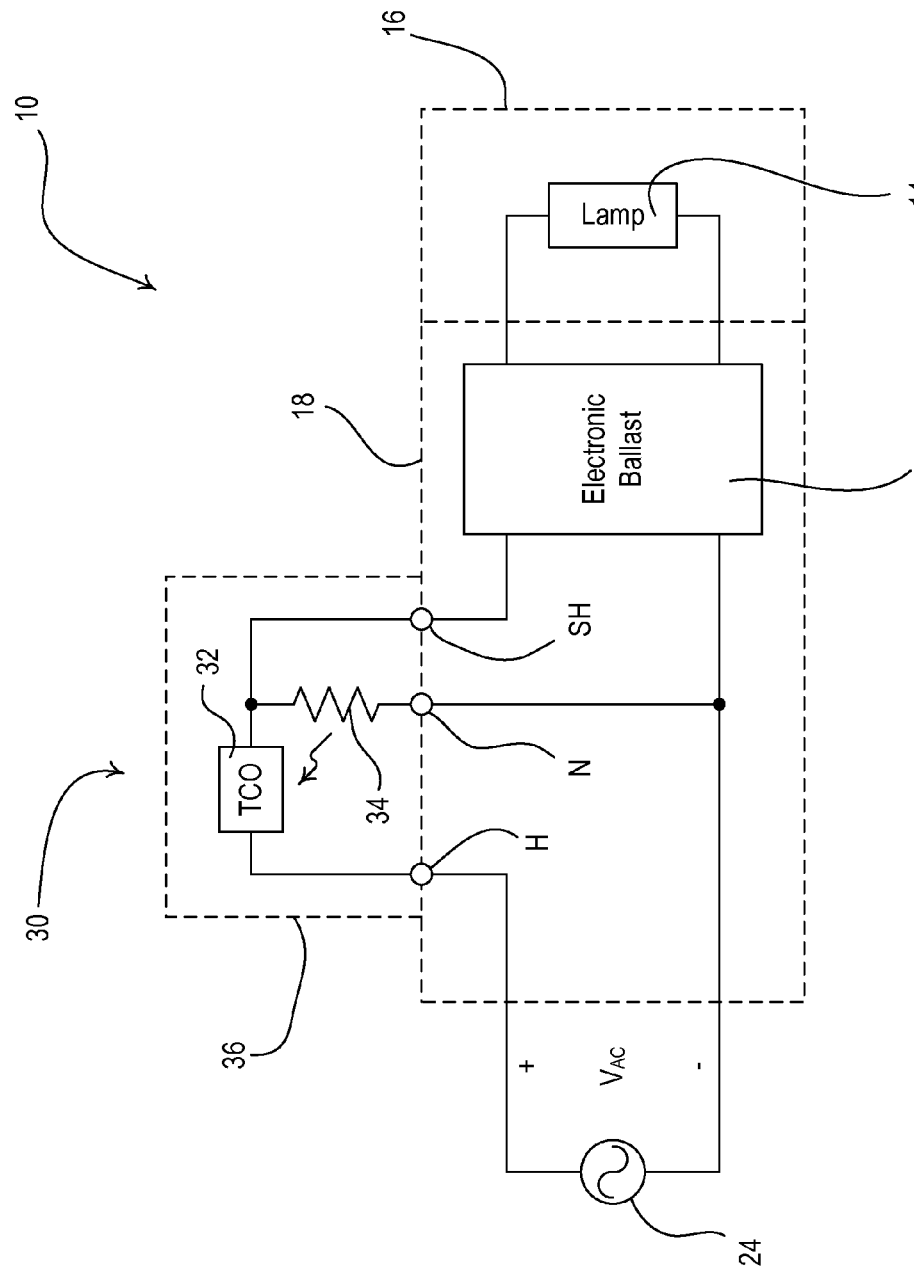
FIG. 2 is a simplified schematic diagram of the downlight fixture showing the insulation detector of FIG. 1 in greater detail.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 3:
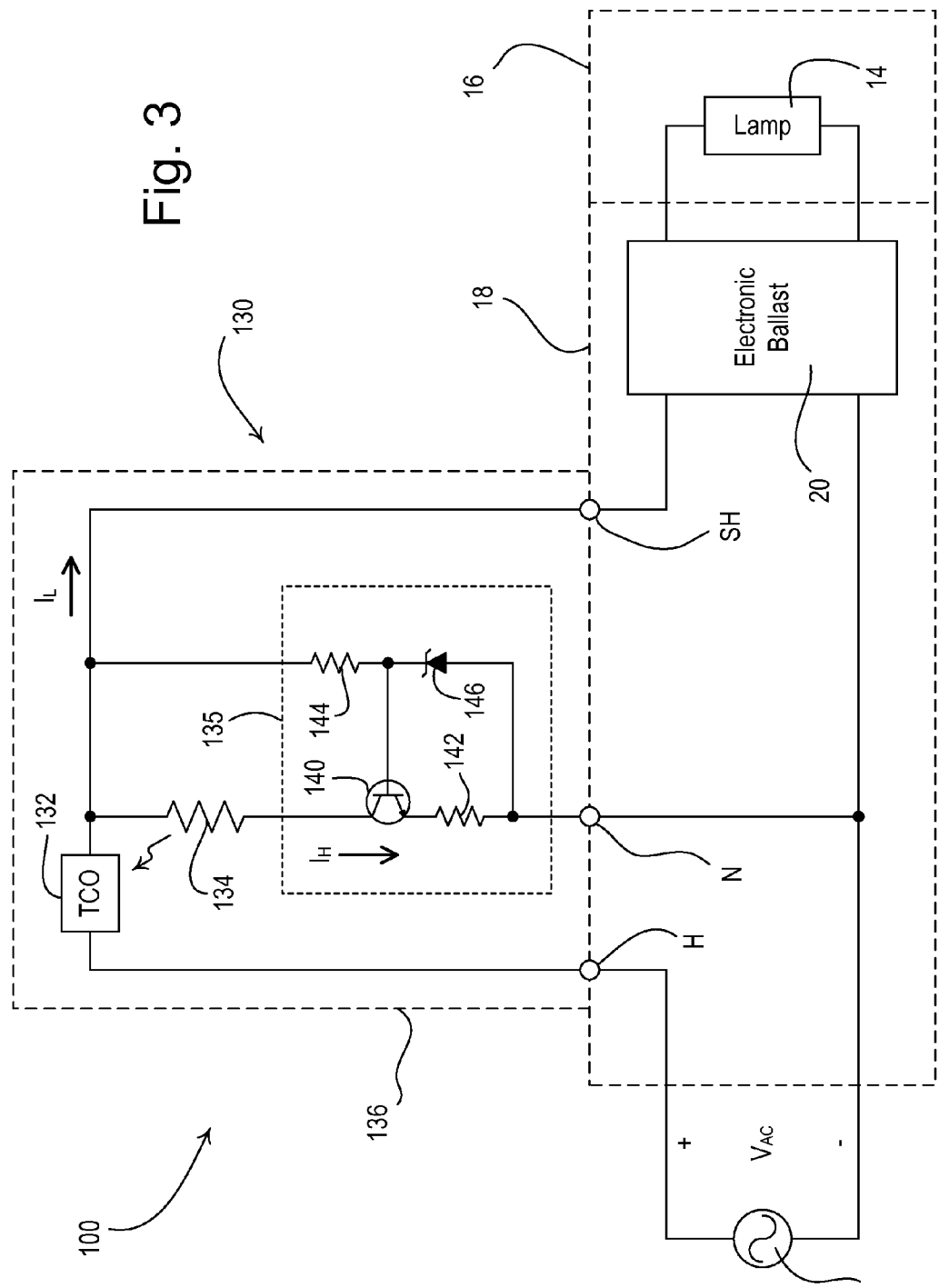
FIG. 3 is a simplified schematic diagram of a downlight fixture having a universal-voltage self-heating thermal detector according to an embodiment of the present invention.

FIG. 3 is a simplified schematic diagram of a downlight fixture 100 having a universal-voltage self-heating thermal detector 130 (i.e., an insulation detector) according to an embodiment of the present invention. The thermal detector 130 comprises a temperature sensitive switch (such as, for example, a bimetallic switch or a TCO switch 132) coupled in series electrical connection between the hot terminal H and the switched hot terminal SH. The TCO switch 132 is operable to conduct a load current $I_L$ from the AC power source 24 to the electronic ballast 18 when the TCO switch 132 is conductive (i.e., closed). The thermal detector 130 further comprises a constant power circuit including a heat source (e.g., a heating resistor 134) and a constant current circuit 135. For example, the heating resistor 134 may have a resistance of approximately 10 kΩ. The constant power circuit is adapted to be coupled in parallel electrical connection with the AC power source 24 to receive the AC mains line voltage $V_{AC}$ when the TCO switch 132 is conductive.

The TCO switch 132, the resistor 134, and the constant current circuit 135 are all housed inside a thermally-conductive enclosure 136, which is made from, for example, a thermally-conductive material that is fire retardant and electrically insulating. The resistor 134 of the constant power circuit is operable to dissipate a constant amount of power independent of the magnitude of the AC mains line voltage $V_{AC}$ when the TCO switch 132 is conductive. Accordingly, an internal temperature $T_{IN}$ inside the thermally-conductive enclosure 136 is responsive to the constant amount of power dissipated by the resistor 134, such that the internal temperature $T_{IN}$ is maintained constant independent of the magnitude of the AC mains line voltage $V_{AC}$. The TCO switch 132 is operable to be rendered non-conductive (i.e., opened) to disconnect the electronic ballast 20 from the AC power source 24 in responsive to the internal temperature $T_{IN}$ inside the thermally-conductive enclosure 136 (i.e., the TCO switch is thermally coupled to the resistor 134 of the constant power circuit). For example, the TCO switch 132 may be characterized by a cut-off temperature of approximately 100° C.

The TCO switch 132 remains conductive (i.e., closed) when the downlight fixture 100 is mounted to a ceiling without insulation surrounding the downlight fixture when there is not restricted airflow over the outer surface of the thermally-conductive enclosure 136 of the thermal detector 130. Accordingly, the heat generated by the resistor 134 of the constant power circuit is able to dissipate from the thermal detector 130 into the surrounding air. However, when the downlight fixture 100 is surrounded by insulation and airflow is restricted over the thermal protector 130, the heat generated by the resistor 134 of the constant power circuit is not able to dissipate into the surrounding insulation and the temperature inside the thermal detector increases, such that the TCO switch 132 opens, thus disconnecting the electronic ballast 20 from the AC power source 24.

The constant current circuit 135 operates to conduct a heating current $I_H$, which has a constant magnitude independent of the magnitude of the AC mains line voltage $V_{AC}$, through the resistor 134, such that the resistor 134 dissipates a constant amount of power independent of the magnitude of the AC mains lines voltage $V_{AC}$. The constant current circuit 135 comprises an NPN bipolar junction transistor 140 having, for example, a gain β of approximately 50. The collector-emitter junction of the transistor 140 is coupled in series with the heating resistor 134 and another resistor 142 (i.e., between the switched hot terminal SH and the neutral terminal N), and is operable to conduct the heating current $I_H$. A resistor 144 and a zener diode 146 are coupled in series between the switched hot terminal SH and the neutral terminal N (i.e., in parallel with the series combination of the heating resistor 134, the collector-emitter junction of the transistor 140, and the resistor 142). The base of the transistor 140 is coupled to the junction of the resistor 144 and the zener diode 146.

The zener diode 146 maintains the voltage developed across the series combination of the collector-emitter junction of the transistor 140 and the resistor 142 approximately constant independent of the magnitude of the AC mains line voltage $V_{AC}$. Accordingly, the magnitude of the heating current $I_H$ is maintained approximately constant, such that the heating resistor 134 dissipates a constant amount of power independent of the magnitude of the AC mains line voltage $V_{AC}$. For example, the resistors 142, 144 may have resistances of approximately 310Ω and 250 kΩ, respectively, and the zener diode 148 may have a break-over voltage of approximately 5 volts, such that the magnitude of the heating current $I_H$ is maintained constant at approximately 14 milliamps, and the resistor 134 dissipates approximately 2 Watts. Since the components of the constant current circuit 135 also generate heat, the constant current circuit 135 may be thermally isolated from the TCO switch 132 and the heating resistor 134.

When the TCO switch 132 is non-conductive, the constant power circuit is also disconnected from the AC power source 124. Therefore, the resistor 134 stops dissipating power and the internal temperature $T_{IN}$ inside the thermally-conductive enclosure 136 decreases until the TCO switch 132 is once again rendered conductive. Alternatively, the TCO switch 132 could be coupled between the switched hot terminal SH and the junction of the heating resistor 134 and the resistor 144 of the constant current circuit 135.

While the present invention has been described with reference to the downlight fixture 100 having an electronic ballast 20 and a fluorescent lamp 14, the universal-voltage self-heating thermal detector 130 of the present invention could be used in other types of mounting fixtures and with other types of load control systems having alternative load regulation devices and electrical loads, such as, for example, an LED driver for an LED lighting source, a motor control device for motor loads, an electrical receptacle for plug-in electrical loads, and a dimmer circuit for other types of lighting loads, such as, incandescent lamps, halogen lamps, magnetic low-voltage lighting loads, and electronic low-voltage lighting loads.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A self-heating thermal protector for an electrical load operable to receive power from an AC power source providing an AC mains line voltage, the thermal protector comprising:
    a thermally-conductive enclosure;
    a temperature-sensitive switch located within the enclosure and adapted to be coupled in series electrical connection between the AC power source and the electrical load, the temperature-sensitive switch operable to be rendered conductive and non-conductive in response to an internal temperature inside the thermally-conductive enclosure; and
    a constant power circuit located within the enclosure and adapted to be coupled in parallel electrical connection with the AC power source to receive the AC mains line voltage when the temperature-sensitive switch is conductive, the constant power circuit operable to dissipate a constant amount of power independent of the magnitude of the AC mains line voltage when the temperature-sensitive switch is conductive;
    wherein restricted airflow over the thermal protector causes the internal temperature inside the thermally-conductive enclosure to increase, such that the temperature-sensitive switch is rendered non-conductive;
    wherein the constant power circuit comprises a heat source thermally coupled to the temperature-sensitive switch, the internal temperature of the thermal protector being dependent upon the constant amount of power dissipated by the constant power circuit;
    wherein the heat source comprises a heating resistor, the constant power circuit further comprising a constant current circuit coupled in series electrical connection with the heating resistor, the series combination of the heating resistor and the constant current circuit adapted to be coupled in parallel electrical connection with the AC power source, the constant current circuit operable to conduct a heating current through the heating resistor when the temperature-sensitive switch is conductive, the heating current having a constant magnitude independent of the magnitude of the AC mains line voltage.

2. The thermal protector of claim 1, further comprising:
    a hot terminal adapted to be coupled to a hot side of the AC power source;
    a neutral terminal adapted to be coupled to a neutral side of the AC power source; and
    a switched-hot terminal;
    wherein the temperature-sensitive switch is coupled in series electrical connection between the hot terminal and the switched-hot terminal.

3. The thermal protector of claim 2, wherein the constant current circuit comprises a current mirror circuit having a first bipolar junction transistor coupled in series with the heating resistor between the switched-hot terminal and the neutral terminal to conduct the heating current, the constant current circuit comprising a second bipolar junction transistor having a base coupled to a base of the first transistor, the second transistor operable to conduct a reference current having a constant magnitude independent of the magnitude of the AC mains line voltage.

4. The thermal protector of claim 3, wherein the constant current circuit further comprising:
    a first resistor coupled between the emitter of the first transistor and the neutral terminal;

a second resistor coupled between the emitter of the second transistor and the neutral terminal;

a third resistor coupled between the collector of the second transistor and the switched-hot terminal, so as to receive the AC mains line voltage when the temperature-sensitive switch is conductive; and a zener diode coupled between the collector of the second transistor and the neutral terminal to maintain the magnitude of the reference current constant and thus maintain the magnitude of the heating current constant.

5. The thermal protector of claim 1, wherein the temperature-sensitive switch is adapted to be coupled in series electrical connection between the AC power source and the constant power circuit, such that, when the temperature-sensitive switch is non-conductive, the constant power circuit is disconnected from the AC power source and the internal temperature inside the thermally-conductive enclosure decreases in magnitude.

6. The thermal protector of claim 1, wherein the temperature sensitive switch comprise a thermal cut-out switch.

7. A self-heating thermal protector for a lighting fixture having a lighting load operable to receive power from an AC power source providing an AC mains line voltage, the lighting fixture also having a load regulation device electrically coupled to the lighting load for driving the lighting load, the thermal protector comprising:

a thermally-conductive enclosure;

a temperature-sensitive switch located within the enclosure and adapted to be coupled in series electrical connection between the AC power source and the load regulation device, the temperature-sensitive switch operable to be rendered conductive and non-conductive in response to an internal temperature inside the thermally-conductive enclosure;

a heating resistor; and a constant current circuit coupled in series electrical connection with the heating resistor, the series combination of the heating resistor and the constant current circuit adapted to be coupled in parallel electrical connection with the AC power source to receive the AC mains line voltage when the temperature-sensitive switch is conductive, the constant current circuit operable to conduct a heating current through the heating resistor when the temperature-sensitive switch is conductive, the heating current having a constant magnitude independent of the magnitude of the AC mains line voltage;

wherein restricted airflow over the thermal protector causes the internal temperature inside the thermally-conductive enclosure to increase, such that the temperature-sensitive switch is rendered non-conductive and the load regulation device is disconnected from the AC power source.

8. The thermal protector of claim 7, further comprising:

a hot terminal adapted to be coupled to a hot side of the AC power source;

a neutral terminal adapted to be coupled to a neutral side of the AC power source; and a switched-hot terminal;

wherein the temperature-sensitive switch is coupled in series electrical connection between the hot terminal and the switched-hot terminal.

9. The thermal protector of claim 8, wherein the constant current circuit comprises a current mirror circuit having a first bipolar junction transistor coupled in series with the heating resistor between the switched-hot terminal and the neutral terminal to conduct the heating current, the constant current circuit comprising a second bipolar junction transistor having a base coupled to a base of the first transistor, the second transistor operable to conduct a reference current having a constant magnitude independent of the magnitude of the AC mains line voltage.

10. The thermal protector of claim 9, wherein the constant current circuit further comprising:

a first resistor coupled between the emitter of the first transistor and the neutral terminal;

a second resistor coupled between the emitter of the second transistor and the neutral terminal;

a third resistor coupled between the collector of the second transistor and the switched-hot terminal, so as to receive the AC mains line voltage when the temperature-sensitive switch is conductive; and a zener diode coupled between the collector of the second transistor and the neutral terminal to maintain the magnitude of the reference current constant and thus maintain the magnitude of the heating current constant.

11. The thermal protector of claim 7, wherein the temperature-sensitive switch is adapted to be coupled in series electrical connection between the AC power source and the heating resistor, such that, when the temperature-sensitive switch is non-conductive, the heating resistor is disconnected from the AC power source and the internal temperature inside the thermally-conductive enclosure decreases in magnitude.

12. The thermal protector of claim 7, wherein the temperature sensitive switch comprise a thermal cut-out switch.

13. A lighting fixture for housing a lighting load operable to receive power from an AC power source providing an AC mains line voltage, the lighting fixture comprising:

a load regulation device electrically coupled to the lighting load for driving the lighting load in order to properly illuminate the lighting load; and a self-heating thermal protector coupled in series electrical connection between the AC power source and the load regulation device, the thermal protector comprising a temperature-sensitive switch, a heat source, and a thermally-conductive enclosure surrounding the temperature-sensitive switch and the heat source, the temperature-sensitive switch coupled in series electrical connection between the AC power source and the load regulation device, the temperature-sensitive switch operable to be rendered conductive and non-conductive in response to an internal temperature inside the thermally-conductive enclosure, the heat source adapted to be coupled in parallel electrical connection with the AC power source to receive the AC mains line voltage when the temperature-sensitive switch is conductive, the heat source operable to dissipate a constant amount of power independent of the magnitude of the AC mains line voltage when the temperature-sensitive switch is conductive;

wherein restricted airflow over the thermal protector causes the internal temperature inside the thermally-conductive enclosure to increase, such that the temperature-sensitive switch is rendered non-conductive and the load regulation device is disconnected from the AC power source;

wherein the heat source comprises a heating resistor, the self-heating thermal protector further comprising a constant current circuit coupled in series electrical connection with the heating resistor, the series combination of the heating resistor and the constant current circuit adapted to be coupled in parallel electrical connection with the AC power source, the constant current circuit operable to conduct a heating current through the heating resistor when the temperature-sensitive switch is conductive, the heating current having a constant magnitude independent of the magnitude of the AC mains line voltage.

14. The lighting fixture of claim 13, wherein the lighting load comprises a fluorescent lamp, and the load regulation device comprises an electronic ballast.

15. The lighting fixture of claim 13, wherein the lighting load comprises an LED light source, and the load regulation device comprises an LED driver.

16. The lighting fixture of claim 13, further comprising:
a housing for the lighting load;
wherein the thermal detector is mounted to an exterior surface of the housing, such that the thermal detector protrudes from the lighting fixture.

17. The lighting fixture of claim 13, further comprising:
a junction box for housing the load regulation device;
wherein the thermal detector is mounted to an exterior surface of the junction box, such that the thermal detector protrudes from the lighting fixture.

\* \* \* \* \*